United States Patent [19]
Schmidt et al.

[11] Patent Number: 6,020,910
[45] Date of Patent: Feb. 1, 2000

[54] BROADCAST SIGNAL RECEIVER RETROFIT APPARATUS AND METHOD

[75] Inventors: David H. Schmidt, Rowayton, Conn.; Carl M. Elam, Perry Hill, Md.

[73] Assignee: Soundview Technologies Incorporated, Greenwich, Conn.

[21] Appl. No.: 08/780,294

[22] Filed: Jan. 8, 1997

Related U.S. Application Data

[63] Continuation-in-part of application No. 08/710,760, Sep. 20, 1996.

[51] Int. Cl.⁷ .................................................. H04N 7/08
[52] U.S. Cl. ........................................... 348/5.5; 348/726
[58] Field of Search .................................. 348/563, 564, 348/734, 726, 5.5, 7, 906

[56] References Cited

U.S. PATENT DOCUMENTS

| | | | |
|---|---|---|---|
| 3,624,289 | 11/1971 | Dudley | 178/7.3 |
| 3,790,700 | 2/1974 | Callais et al. | 178/5.1 |
| 4,021,849 | 5/1977 | Wheeler | 358/165 |
| 4,225,884 | 9/1980 | Block et al. | 358/122 |
| 4,390,901 | 6/1983 | Keiser | 358/147 |
| 4,461,032 | 7/1984 | Skerlos | 455/4 |
| 4,520,404 | 5/1985 | Von Kohorn | 358/335 |
| 4,554,584 | 11/1985 | Elam et al. | 358/165 |
| 4,598,288 | 7/1986 | Yarbrough et al. | 340/325.34 |
| 4,605,964 | 8/1986 | Chard | 358/147 |
| 4,605,973 | 8/1986 | Von Kohorn | 358/335 |
| 4,621,285 | 11/1986 | Schilling et al. | 358/120 |
| 4,633,495 | 12/1986 | Schotz | 381/3 |
| 4,718,107 | 1/1988 | Hayes | 455/4 |
| 4,740,834 | 4/1988 | Mobarry | 358/84 |
| 4,888,796 | 12/1989 | Olivo, Jr. | 379/101 |
| 5,033,085 | 7/1991 | Rew | 380/20 |
| 5,172,111 | 12/1992 | Olivo, Jr. | 340/325.31 |
| 5,195,135 | 3/1993 | Palmer | 380/20 |
| 5,214,556 | 5/1993 | Kilbel . | |
| 5,270,822 | 12/1993 | Choi | 358/188 |
| 5,387,942 | 2/1995 | Lemelson | 348/474 |
| 5,485,518 | 1/1996 | Hunter et al. | 380/20 |
| 5,583,576 | 12/1996 | Perlman et al. | 348/460 |
| 5,629,733 | 5/1997 | Youman et al. | 348/7 |
| 5,751,335 | 5/1998 | Shintani | 348/5.5 |
| 5,758,258 | 5/1998 | Shoff et al. . | |

FOREIGN PATENT DOCUMENTS

| | | |
|---|---|---|
| 2209417 | 5/1989 | United Kingdom . |
| 2267768 | 12/1993 | United Kingdom . |
| WO83/02208 | 6/1983 | WIPO . |
| 82/00352 | 8/1983 | WIPO . |
| WO 8911199 | 11/1989 | WIPO . |
| WO 96/25821 | 8/1996 | WIPO . |

*Primary Examiner*—Nathan Flynn
*Attorney, Agent, or Firm*—Finnegan, Henderson, Farabow, Garrett & Dunner, L.L.P.

[57] ABSTRACT

A broadcast signal receiver retrofit apparatus that receives broadcast signals, detects rating or category codes therein and compares the detected codes to a setting set in the retrofit device. If the comparison indicates that the incoming signal has a rating greater than that set or is of an undesired category the broadcast signal is blocked or an audio or visual alert is given. The retrofit device may be tamper-resistant to prevent disabling the device.

24 Claims, 17 Drawing Sheets

BROADCAST SIGNAL RECEIVER RETROFIT APPARATUS AND METHOD

This application is a continuation-in-part of application Ser. No. 08/710,760, filed Sep. 20, 1996.

BACKGROUND OF THE INVENTION

The present invention relates generally to blocking audio-video television signals and specifically to retrofitting audio-video signal receivers with a signal blocking device so that users can prevent reception of programming having a rating signal greater than that selected by the user.

Television is an important medium of information and entertainment in modem society. To encompass the differing tastes and standards of individual viewers, networks and local TV stations broadcast violent and adult theme programs as well as other types of programming that viewers might find objectionable or inappropriate for children. Parents may not want their children to view these programs, but they cannot always monitor their children's viewing habits. Other viewers, too, may not wish to receive what they consider to be objectionable programming.

The patent literature describes systems that can block or prevent objectionable programs. For example, U.S. Pat. No. 4,554,584 issued to Elam et al. discloses a video and audio blanking system with an auxiliary circuit that detects and decodes digital code words transmitted as part of the video signal. The disclosed system will blank the audio or video portion, or both, of the transmitted signal according to the transmitted code. The system disclosed in Elam et al., as well as those disclosed generally in the prior art shows the video and audio blanking circuitry in the television tuner.

Another example of this is U.S. Pat. No. 4,225,884 issued to Block et al. which discloses subscriber station equipment that may include program access and control including a category selection knob allowing the subscriber to operate a key-controlled switch that can be locked and tuned to a particular category of programming. The category knob includes a pointer indicator that can be turned to a number of different category positions. The categories can represent classifications of broadcast programs based on the subject matter content of the programs. Block et al. discloses a category selection feature to permit selective control by the subscriber of the programs that can be viewed. Block et al. also discloses that the key lock selector knob allows parents to prevent unauthorized viewing by children of programs having sensitive subject matter. The circuitry, however, is internal to the television.

One problem with existing signal blocking devices is that they are designed to be installed as part of the customer equipment, such as the TV or cable box. Not all TVs or cable boxes have such circuitry, however. Moreover, merely adding a signal blocking circuit in series with the TV may be unsatisfactory because in conventional series connections, someone can disconnect the circuit and render it useless.

A need therefore exists to retrofit TVs and other audio/video equipment with tamper-resistant signal blocking technology. Such a retrofit device should block signals having a certain rating code, the signals being broadcast, cable, satellite (so-called direct broadcast satellites), VCR, or any other type of signal received by a TV. Such a retrofit device can receive either demodulated or modulated signals.

To prevent tampering, the a retrofit device should also block signals or not supply power to the output device if the connections between the retrofit signal blocking device and the output device are not properly made. It would also be desirable if the retrofit device gave an audible or visual warning when objectionable material is being broadcast.

SUMMARY OF THE INVENTION

The present invention meets this need by monitoring an auxiliary signal from an output device such as a television set. When that signal does not agree with the present selection criteria, the transmission of the signals to the output device is blocked. Also, a connection check can ensure that the device is not being bypassed.

The present invention also meets this need by receiving demodulated audio and video signals from equipment including a cable box, a VCR, a DBS receiver, or other equipment. Rating data in the input signals is detected and when the rating data does not agree with the preset selection criteria, transmission of the signals to the output device in a humanly perceivable form is prevented.

Other advantages and purpose of this invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the present invention provides methods and apparatus for retrofitting broadcast signal receivers with broadcast signal blocking technology. Specifically, the present invention comprises a method of controlling whether a demodulated video signal containing rating information is sent to an output device, comprising the steps, executed by a blocking device, of receiving the demodulated video signal before the demodulated video signal reaches the output device, extracting rating information from the demodulated video signal, comparing the extracted rating information with a preset rating level; and preventing the output device from producing a humanly perceivable output when the retrieved rating information does not meet the preset level.

BRIEF DESCRIPTION OF THE DRAWINGS

The accompanying drawings, which are incorporated in and constitute a part of this specification, illustrate embodiments of the invention, and, together with the description, serve to explain the principles of the present invention.

DESCRIPTION OF THE PREFERRED EMBODIMENT

Current methods for signal blocking use encoded data transmitted along with the actual broadcast signal to determine the content and suitability of the program. The present invention retrofits this technology into older model audio-video signal receivers that do not contain their own signal blocking technology. The present invention assumes that rating codes are present in the broadcast signals.

Figure 1:
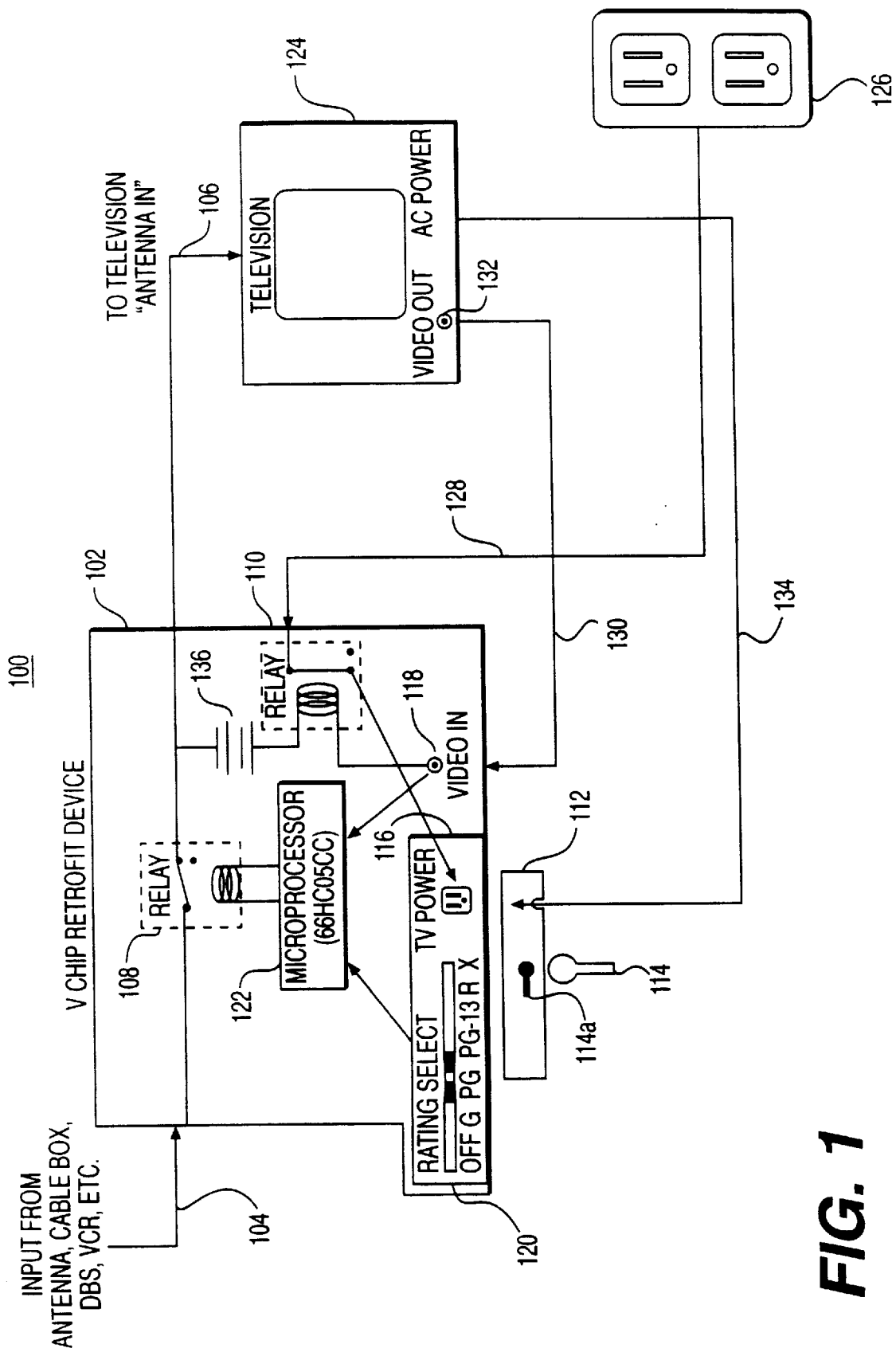
FIG. 1 is a block diagram of a broadcast signal receiver retrofit apparatus according to a first embodiment of the present invention.

FIG. 1 is a block diagram of a retrofit apparatus according to a first embodiment of the present invention. According to a first embodiment of the present invention, retrofit device 100 is contained in a stand-alone junction box 102. Retrofit device 100 receives a broadcast signal via an input device, such as signal in cable 104 that transmits the broadcast signal from an antenna, cable box, VCR, radio, or satellite. Inside junction box 102, the broadcast signal passes across broadcast signal interrupt relay 108 and out of junction box 102 through a broadcast signal output device, such as antenna in cable 106 that transmits the broadcast signal to an output device, such as a television 124 or a VCR.

Television 124 has an auxiliary broadcast signal output, such as an RCA video output jack, that can supply a broadcast signal back to the retrofit device 100. This signal is input to the retrofit device 100 through an auxiliary broadcast signal input connection, video-in 118, from video out connection 132 of television 124 over video cable 130.

The retrofit device 100 also includes signal blocking selector switch 120, which is preferably a multi-position rating select switch. The selector switch 120 could alternatively be a dial-type device or any other type of device in which a particular setting may be selected. The user sets the selector switch 120 to a desired setting such as G, PG, PG-13, R, X, or ALL. The settings or arrangement of switch 120 can be modified for different implementation. For example, the selector switch 120 could be a category selection device whereby a user can select desired categories or block undesired categories by incoming programming. In the preferred embodiment, if the selector switch 120 is set to the rating PG-13, all input broadcast signals having a rating signal of PG-13 or below pass through to the output device.

The broadcast signal from the auxiliary broadcast signal input connection 118 and the selected rating code from the selector switch 120 are inputs to microprocessor 122, which can be a Motorola 68HC05CC2 or similar microprocessor capable of performing the needed operations. The microprocessor 122 decodes the rating data input at the video in connection and extracts the program rating code transmitted with the broadcast signal. Microprocessor 122 then compares the extracted code with the selected rating code, and either maintains or interrupts the transmission of the broadcast signal to the television 124 by appropriately controlling interrupt relay 108. Although an interrupt relay is shown in FIG. 1, other types of devices, such as a signal scrambler, could also be used in the present invention.

Electrical power is supplied to the retrofit device 100 and the television 124 through power feed cord 128, coupled to a power outlet 126, and power supply cord 134, which connects the AC power of the television 124 to the broadcast receiver power supply socket 116. Socket 116 and power feed cord 128 are coupled to a power supply interrupt relay 110 and electrical power is passed therethrough. Microprocessor 122 opens power supply interrupt relay 110 if it determines that either antenna in cable 106 or video cable 130 are not properly connected. When the power supply interrupt relay 110 is opened, no power will be sent to the television 124 through power feed cord 134.

Device 100 also contains other design elements to prevent bypassing it. For example, the retrofit device 100 may be rendered tamper-resistant by a lockable hinged access door 112 provided as part of the junction box 102. Broadcast signal blocking criteria selector switch 120 and broadcast receiver power supply socket 116 are preferably behind the access door 112. Access door 112 has keyhole 114A and key 114 to provide a locking mechanism to secure the access door 112 when retrofit device 100 is in operation. Access door 112 also preferably has a notch 116A large enough to allow the broadcast receiver power supply cord 134 to pass therethrough but not large enough that the broadcast receiver plug can be pulled out through it. Therefore, once connected and operating, the system cannot be disconnected without key 114.

The retrofit device 100 of the present invention may also be rendered tamper-resistant by a connection check that determines whether all connections are properly made. The connection check is designed to act as a safeguard against a user trying to disable the retrofit device 100 and is designed to shut down power to the television 124 if the antenna in cable 106 from the retrofit device 100 is not plugged into the television 124, or the video cable 130 connecting the video out 132 on the television 124 and video in connection 118 on the retrofit device 100 is not properly connected.

A connection check may be performed in several ways. For example, a low d.c. voltage device 136, preferably set at 3VDC, has its positive side tied to the shielding of antenna in cable 106. The signal output from the voltage device passes through the chassis of television 124 and returns to the retrofit device 100 through the ground wire of the video cable 130. Power relay 110 has one side of its coil tied to the negative side of voltage device 136, and the other side tied to the ground terminal of the video in connection 118. As long as the antenna in cable 106 and the video cable 130 are attached, the power relay 110 allows power to the TV power receptacle 116. If either of the cables 106 or 130 is removed, the power relay 110 does not allow power to the TV power receptacle 116 and television 124 is not powered.

Figure 2:
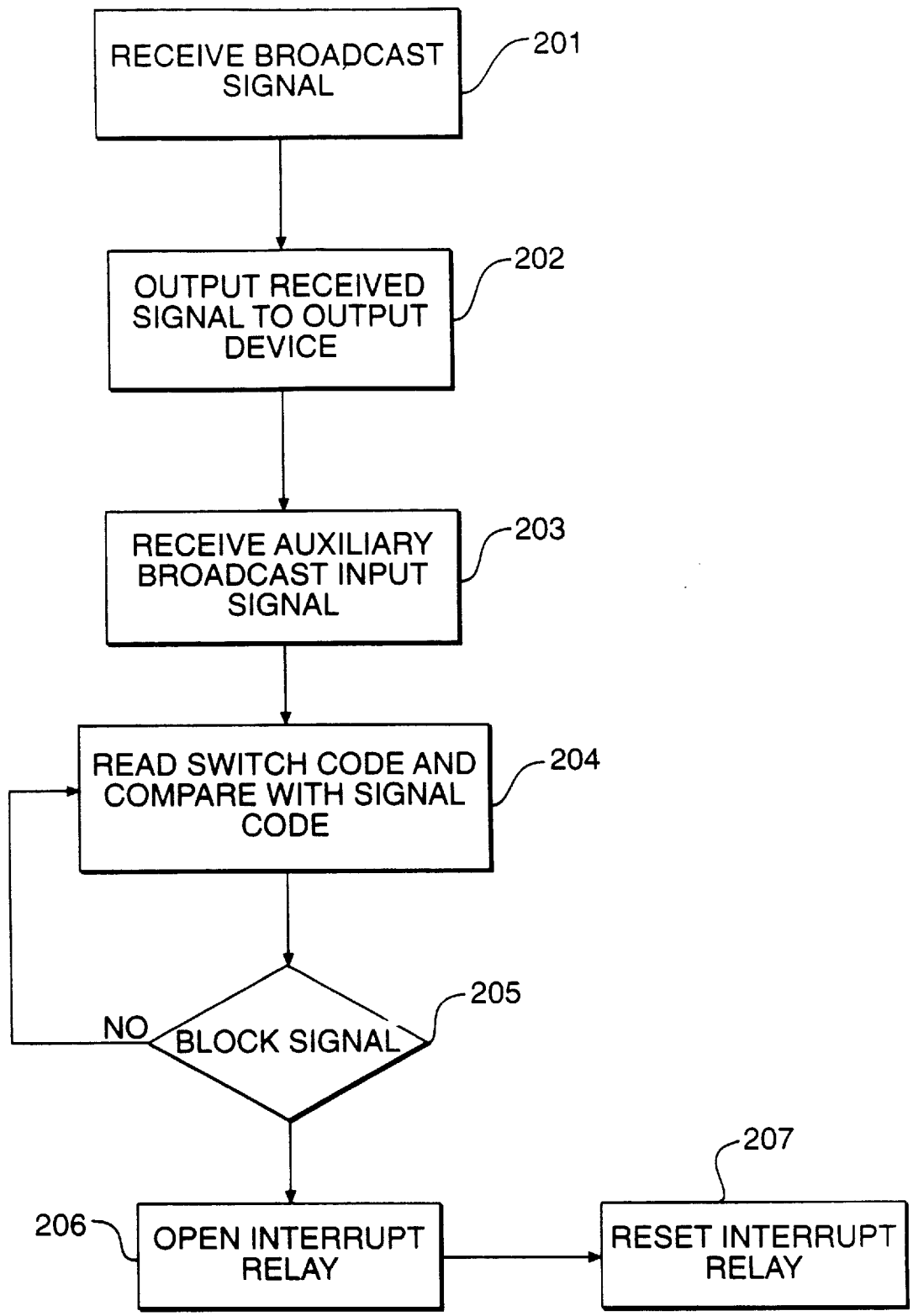
FIG. 2 is a flow diagram showing the operation of a signal blocking portion of the retrofit device shown in FIG. 1.

The signal blocking operation using the retrofit device 100 shown in FIG. 1 is illustrated in FIG. 2. A broadcast signal is received over signal-in cable 104 (step 201). The broadcast signal passes through the broadcast signal interrupt relay 108 and is output via antenna in cable 106 to an output device, such as television 124 (step 202). The auxiliary broadcast signal from the television 124 enters the auxiliary broadcast signal input connector 118 over video cable 130 and proceeds to microprocessor 122 (step 203). Microprocessor 122 reads the preset selector switch setting code from selector 120 and compares it to the actual program rating in the broadcast signal (step 204). Based on the comparison, the microprocessor 122 determines whether the broadcast signal should be blocked (step 205). If the microprocessor 122 determines that the broadcast signal should not be blocked, the process simply repeats and the broadcast signal continues to be output to television 124.

If the signal is determined to be one that should be blocked, then microprocessor 122 opens broadcast signal interrupt relay 108 (step 206). The microprocessor 122 later resets broadcast signal interrupt relay 108 (step 207). It does so because when the relay 108 is opened, the signal to video-in connection 118 is cut off, at which point the microprocessor 122 cannot determine what ratings are present. By continuously switching the relay 108 on and off, for example on for 0.3 seconds and off for 2 seconds, the microprocessor 122 can confirm the objectionable rating during the 0.3 second on time. If the user changes channels, the system will not remain blank.

In this manner an objectionably rated program will continue to switch on and off until either the channel is changed to receive an acceptable program, the television 124 is turned off, or a new program with an acceptable rating begins. The switching timing can be set up, for example, so that the objectionable programming is on for approximately 0.3 seconds and is off for approximately 2 seconds, and can be modified as appropriate.

As described above, device 100 incorporates voltage device 136 to perform a connection check. A potential problem with retrofit device 100 is that if the video cable 130 is removed from video out 132 on the television 124 and plugged into another RCA jack, such as an audio out, a connection check would show that all connections are properly made to the retrofit device 100 and no rating data would be read by the microprocessor 122. This problem can be overcome if the microprocessor 122 is programmed to blank any programming not containing rating data. However, this would result in programs without ratings, such as news and commercials, being constantly blocked.

Figure 3:
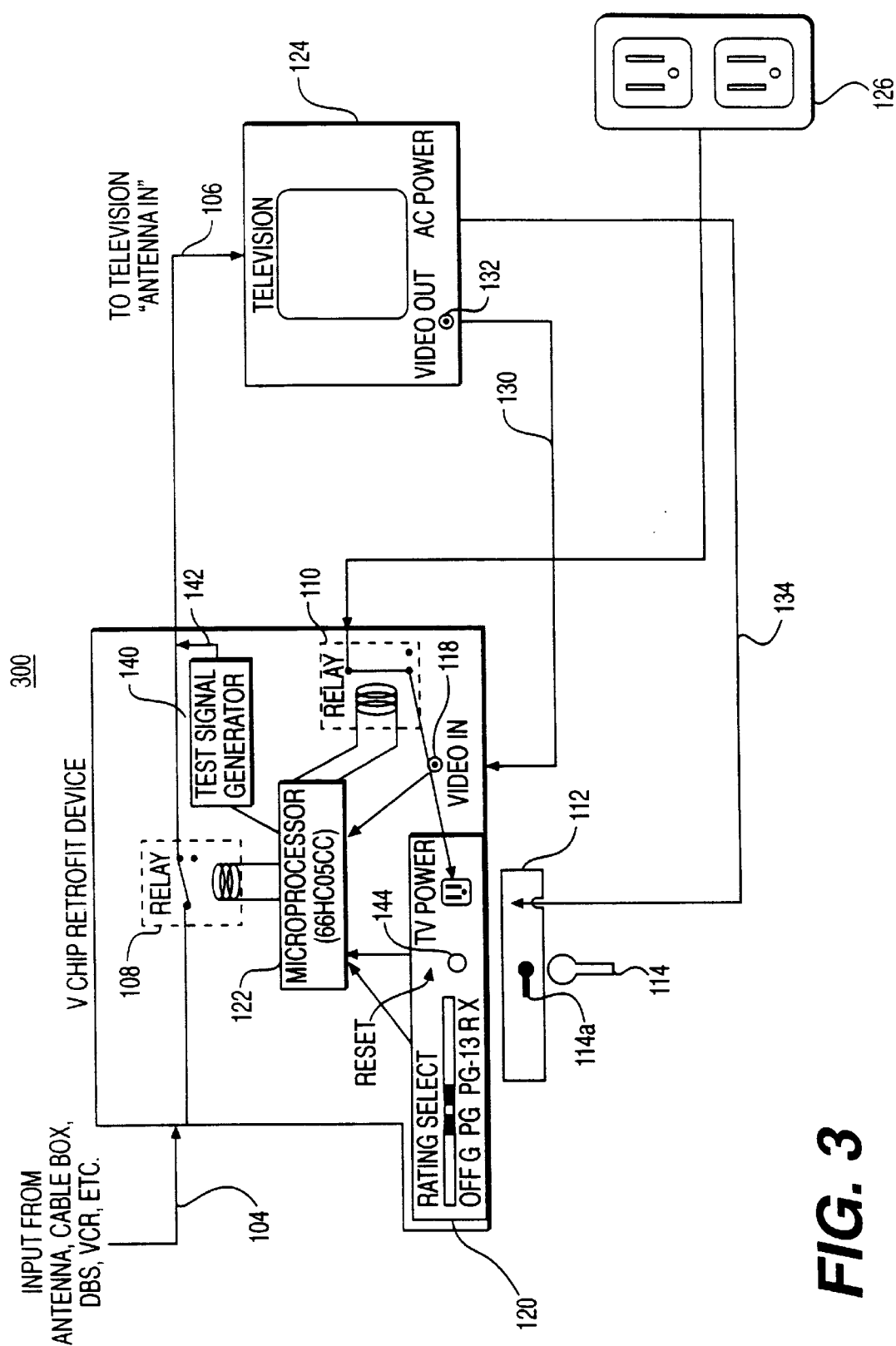
FIG. 3 is a block diagram of a broadcast signal receiver retrofit apparatus according to a second embodiment of the present invention.

A more sophisticated connection check system is depicted in FIG. 3. FIG. 3 is a block diagram of a broadcast signal receiver retrofit apparatus according to a second embodiment of the present invention. Like elements from FIG. 1 have the same reference numbers.

The connection check circuitry of FIG. 3 checks that all connections to the retrofit device are properly made by outputting a unique signal to the output device and then checking to see whether that unique signal is returned from the output device to the retrofit device. For example, as shown in FIG. 3, the retrofit device 300 includes a test signal generator 140 that injects a test signal 142 that will not interfere with the existing signals onto the antenna in cable 106. The test signal 142 passes through television 124 and out of the video out connector 132 over video cable 130. The microprocessor 122 looks for signal 142 at the video in connection 118 on the retrofit device 300. While the signal 142 is detected, the microprocessor 122 will direct the power relay 110 to remain closed, thereby allowing power to the power receptacle 116. When signal 142 is not detected, the microprocessor 122 will assume that a connection has been broken and direct the power relay 110 to cut power to the power receptacle 116. The power will remain cut until the reset button 144 is pressed, which is preferably located behind the lockable access door 112.

Alternately, the reset button 144 can be removed and the microprocessor 122 can automatically reset power after one minute and check to see if the connections have been properly repaired. This way, if a child accidentally removes a cable 106 or 130, someone can replace it and the system will reset itself, rather than waiting for a parent with a key.

The benefit of the connection circuitry shown in FIG. 3 is that the retrofit device 300 cannot be fooled if someone switches the video cable 130 with another RCA jack on the television 124.

Figure 4:
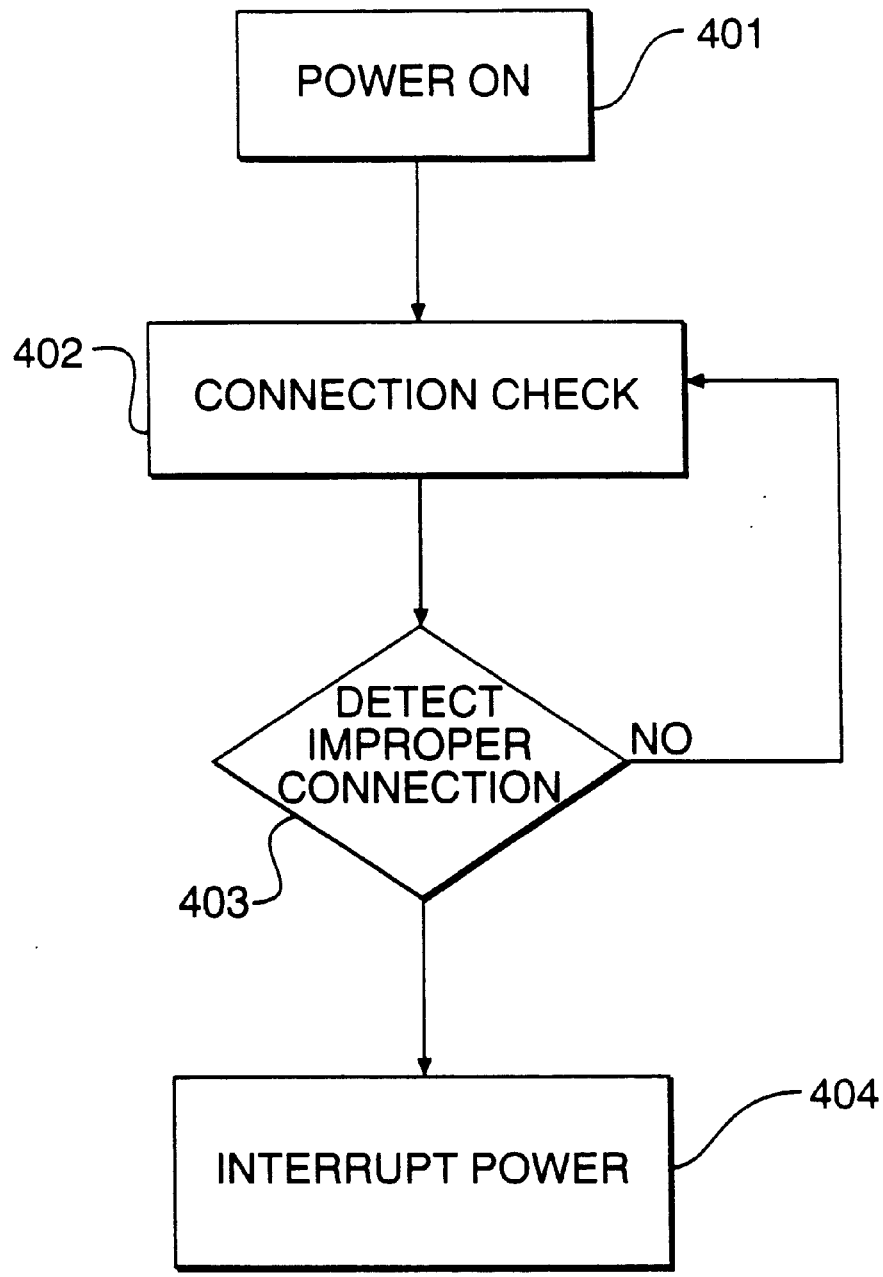
FIG. 4 is a flow diagram showing the operation of a connection check portion of the retrofit device in accordance with the present invention.

FIG. 4 is a flow diagram illustrating the steps of the connection check that may be performed by either of the retrofit devices shown in FIGS. 1 and 3. The retrofit device is turned on (step 401), e.g., plugged in. Once plugged in, microprocessor 122 performs a connection check (step 402) to determine whether antenna in cable 106 and the video-in cable 130 are properly connected. The microprocessor 122 continually conducts the connection check, as long as there are no failures of the test.

If an improper connection is detected (step 403), microprocessor 122 opens the power supply interrupt relay 110 and interrupts power to the television 124 via socket 116 (step 404). This turns off the television 124 until antenna in cable 106 and the video in cable 130 are properly reconnected. Such a connection check ensures that one cannot unplug the retrofit device and receive programming meant to be blocked, and will determine whether the video cable 130 and antenna in cable 106 are properly connected to the retrofit device.

The embodiments discussed above use the video out signal. This is not the only signal that can be used in accordance with this invention. For example, conventional television receivers tune to a particular channel by generating a local oscillator output, LO, which is unique for each channel. In conventional television receivers, the LO signal travels through the tuner section of the television and a small portion leaks back out through the antenna wire.

Figure 5:
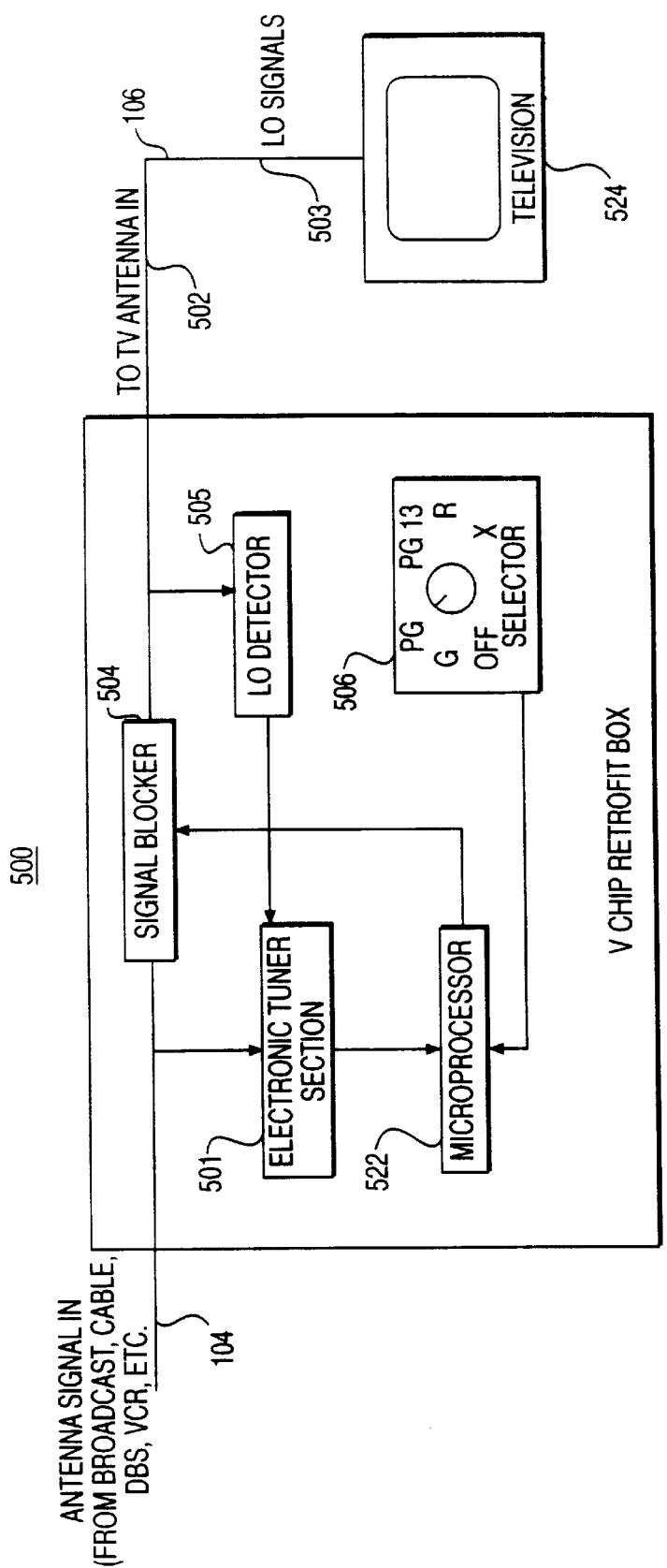
FIG. 5 is a block diagram of a broadcast signal receiver retrofit apparatus according to a third embodiment of the present invention.

FIG. 5 is a block diagram of a broadcast signal receiver retrofit apparatus according to a third embodiment of the present invention. Like elements from FIG. 1 have the same reference numbers.

FIG. 5 illustrates a retrofit device 500 including an onboard electronic tuner section 501 that determines which channel a television 524 is tuned to. The retrofit device 500 can be used with any television 524, without requiring a "video out" jack. As shown in FIG. 5, a signal is input to the retrofit device 500 over signal in cable 104 and is input to the electronic tuner section 501, passes through a signal blocker 504, and is input to television 524. An LO detector 505 in the retrofit device 500 receives the stray LO signals 503 output from the television 524 and sets the electronic tuner section 501 to the same channel as the television 524. Once tuned to the proper channel, the electronic tuner section 501 demodulates rating signals from the input signal and sends them to a microprocessor 522 capable of reading and processing the demodulated signals.

A selector switch 506, similar to that shown in FIG. 1, in the retrofit device 500 enables the user to select the type of programs to be blocked. As shown in FIG. 5, the selector switch 506 can be set to various ratings, similar to those used to rate movies. Although the letter rating system shown in FIG. 5 may be used, the present invention may also be used with other rating schemes such as rating by program category. When set to the "off" position, all incoming programs will be sent to the television 524.

The microprocessor 522 controls the operation of signal blocker 504, which can take the simple form of an on/off relay 108 in FIG. 1 or, in a more elaborate system, a signal scrambler. When activated, signal blocker 504 prohibits the intelligible transmission of the input signal to the television 524. The signal blocker 504 is activated when the microprocessor 522 compares the demodulated rating data and the selector switch 506 setting and determines that the rating of the incoming programming is greater than that set in the selector switch 506.

As with the retrofit device 100 shown in FIG. 1, protective measures may be used to secure the retrofit device 500 from tampering, e.g., locking the connectors behind an access door, and/or running a connection check. Only TV sets with video out jacks, however, can use the connection check.

Figure 6:
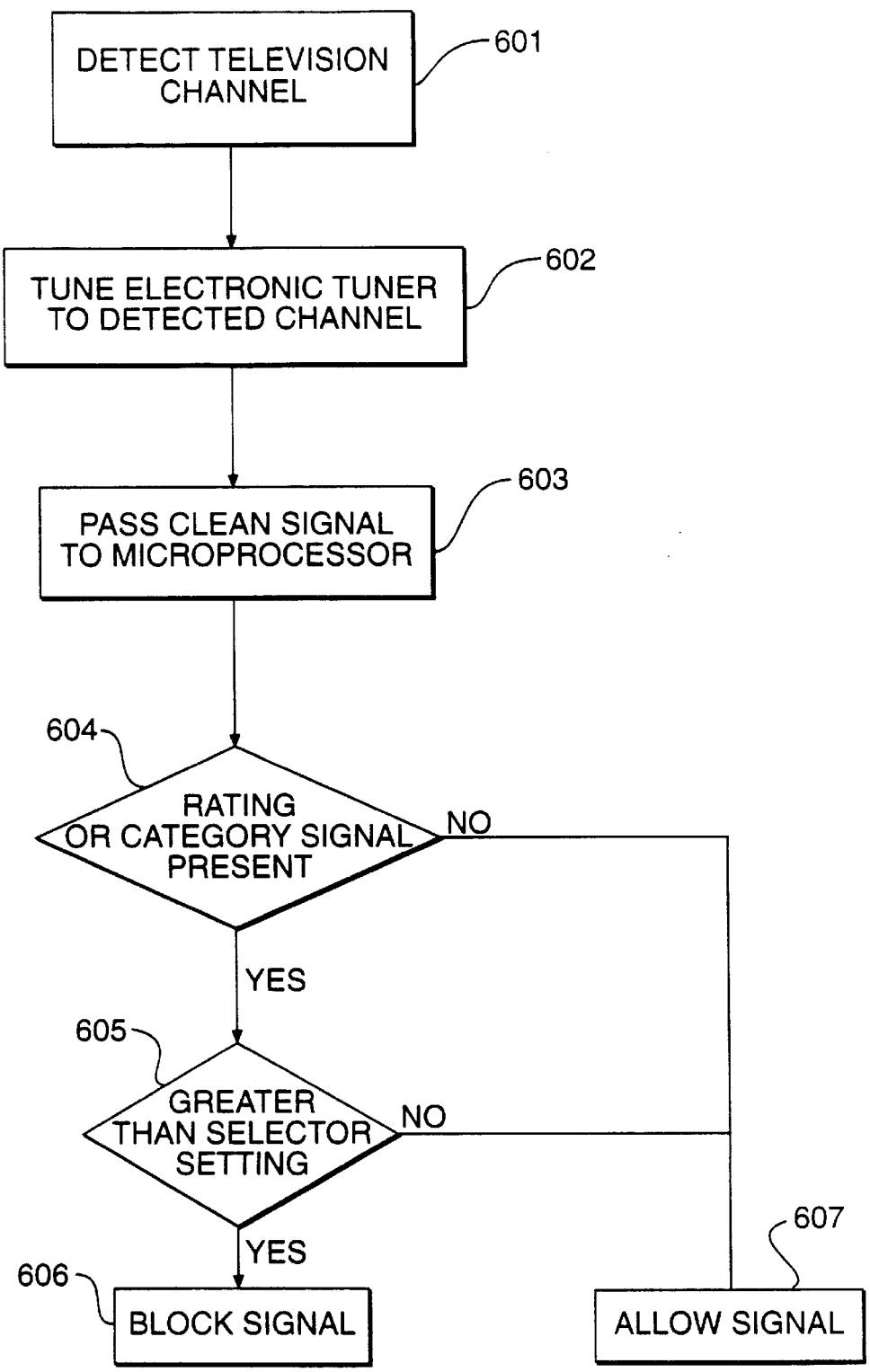
FIG. 6 is a flow diagram of the operation of the broadcast signal receiver retrofit apparatus shown in FIG. 5.

FIG. 6 is a flow diagram of the signal blocking operation of the broadcast signal receiver retrofit apparatus 500 shown in FIG. 6. First, the LO detector 505 determines the channel to which the television 524 is tuned (step 601). Next, the LO detector 505 directs the electronic tuner section 501 to tune to the detected channel (step 602). Once the electronic tuner section 501 is properly tuned, it passes a signal to the microprocessor 522 (step 603). The microprocessor 522 looks for any rating data present in the signal (step 604). If there is no such data present, the incoming signal is allowed to pass to the television 524 (step 607). If such data is present, the microprocessor 522 compares the rating data with the setting on the selector switch 506 (step 605). If the comparison indicates that a program is acceptable, microprocessor 522 directs the signal blocker 504 to pass the signal to television 524 (step 607). If the comparison indicates that a program is not acceptable, the signal blocker 504 is directed to block the signal to the television 524 (step 606).

Figure 7:
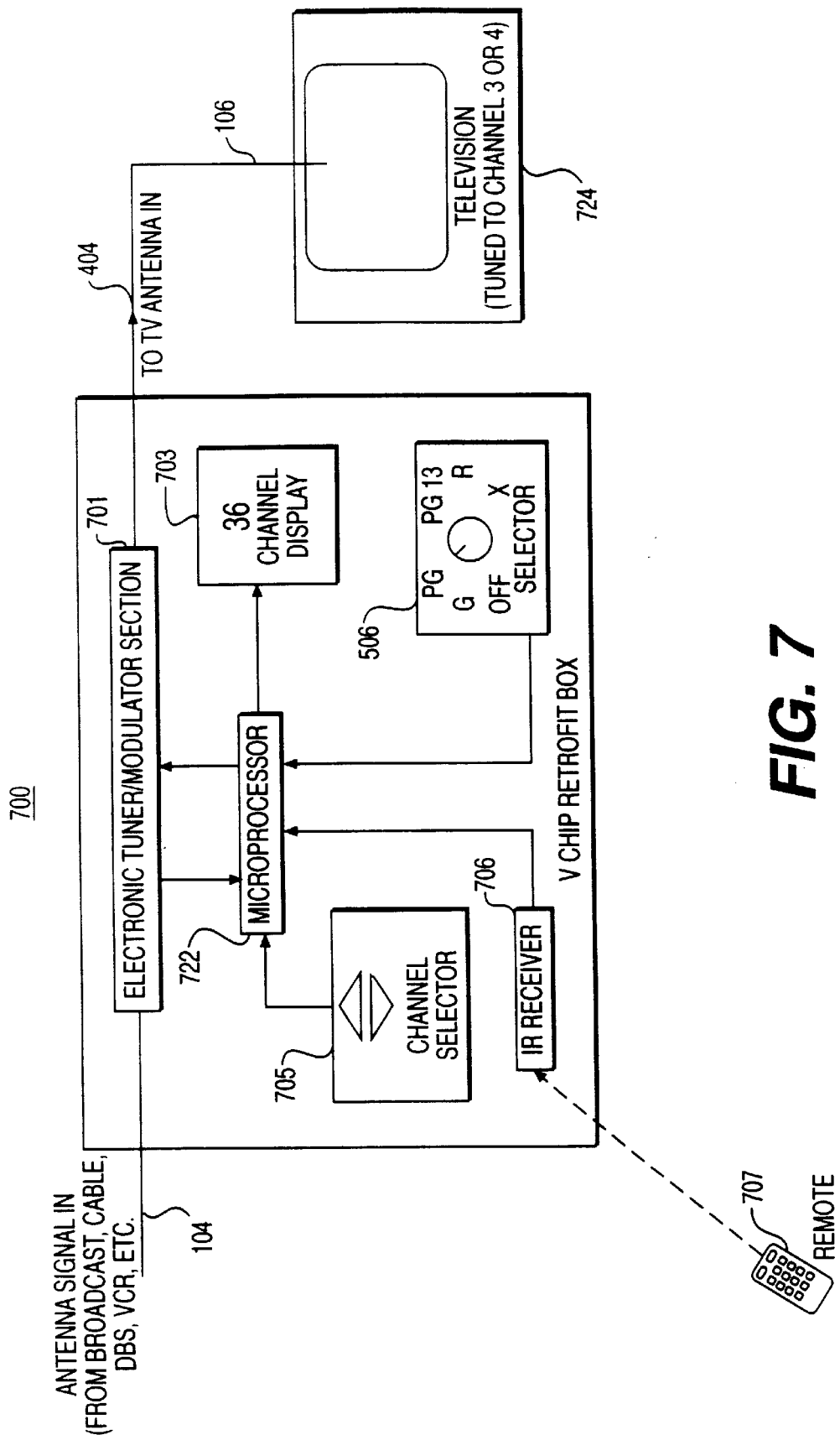
FIG. 7 is a block diagram of a broadcast signal receiver retrofit apparatus according to a fourth embodiment of the present invention.

Another way to control viewing is to use an external circuit for a tuner. FIG. 7 is a block diagram of a broadcast signal receiver retrofit apparatus according to a fourth embodiment of the present invention. The retrofit device 700 acts as a substitute for a television tuner, as a standard cable box sometimes does. As in a cable system, the television 724 is tuned to channel 3 or 4. All channel selections are made using a separate remote control 707 that transmits signals to IR receiver 706, or channel selector buttons 705 on the retrofit device 700. The system shown in FIG. 7 is well suited for a television 724 receiving broadcast or cable transmissions where a cable box is not required. The retrofit device 700 preferably includes an electronic tuner/modulator section 701, a microprocessor 722, a channel display 703, a rating selector 506, and a channel selector 705.

Figure 8:
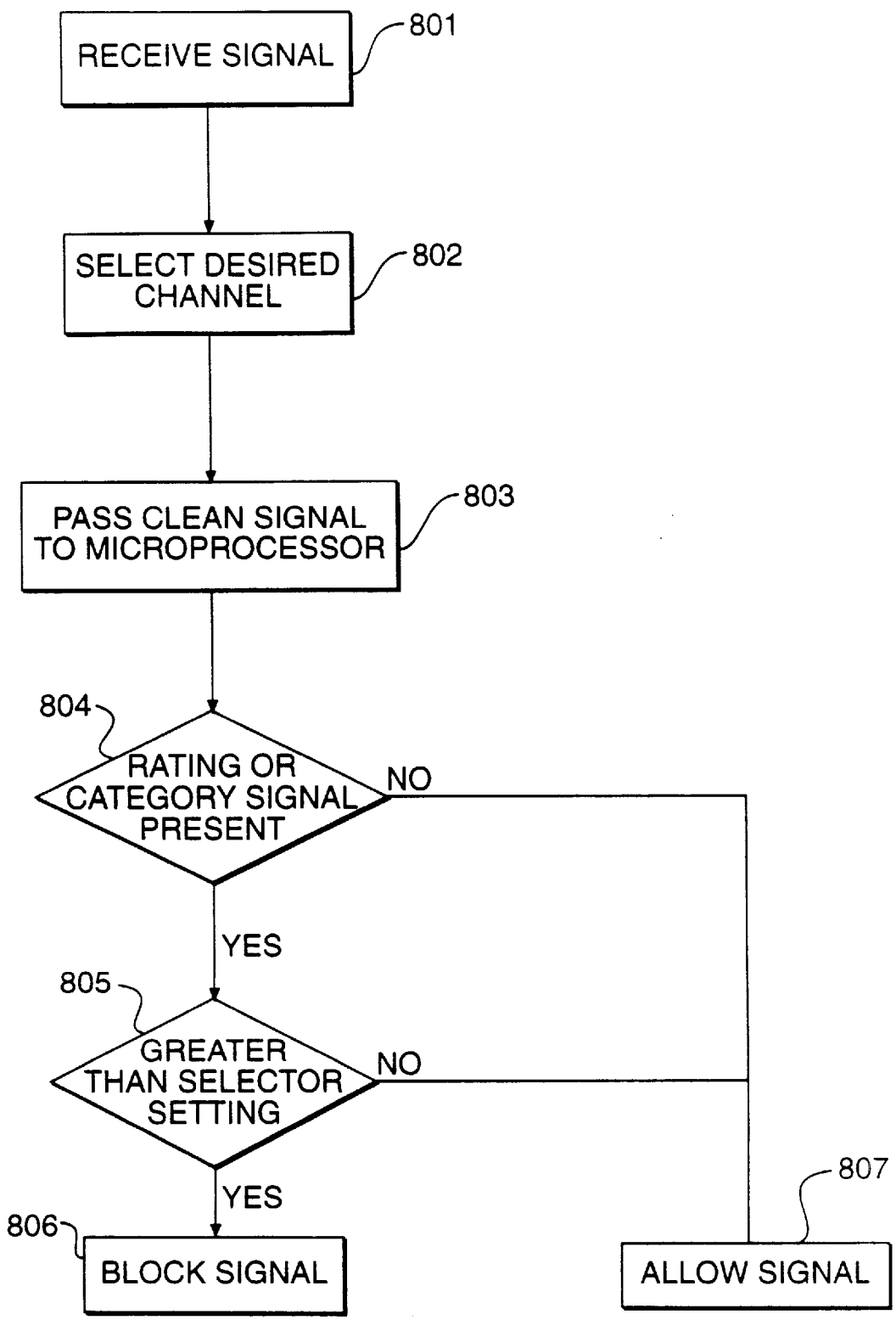
FIG. 8 is a flow diagram of the operation of the broadcast signal receiver retrofit apparatus shown in FIG. 7.

FIG. 8 is a flow diagram of the operation of the broadcast signal receiver retrofit apparatus 700 shown in FIG. 7 First, the retrofit device 700 receives an input signal over antenna in cable 104 into electronic tuner/modulator section 701 (step 801). The user selects the desired channel with either the remote 707, or the channel selector buttons 705 (step 802), and the display 703 indicates the selected channel. A broadcast signal from the selected channel then passes to the microprocessor 722 (step 803).

Microprocessor 722 looks for rating data from the broadcast signal on the selected channel (step 804). If such data is present, microprocessor 722 compares it with the setting of rating selector 506 (step 805). If no rating data is present (step 804), or if the comparison indicates that a program is acceptable (step 805), the microprocessor 722 directs section 701 to transmit the signal 404 via channel 3 or 4 to the television 724 and monitoring continues (step 807). If the comparison indicates that a program is not acceptable (step 805), the microprocessor 722 disables section 701 thereby blocking signal transmission to the television 724 until programming with an acceptable rating is detected (step 806). The retrofit device 700 may also be rendered tamper resistant, as described above with respect to FIG. 1.

Figure 9:
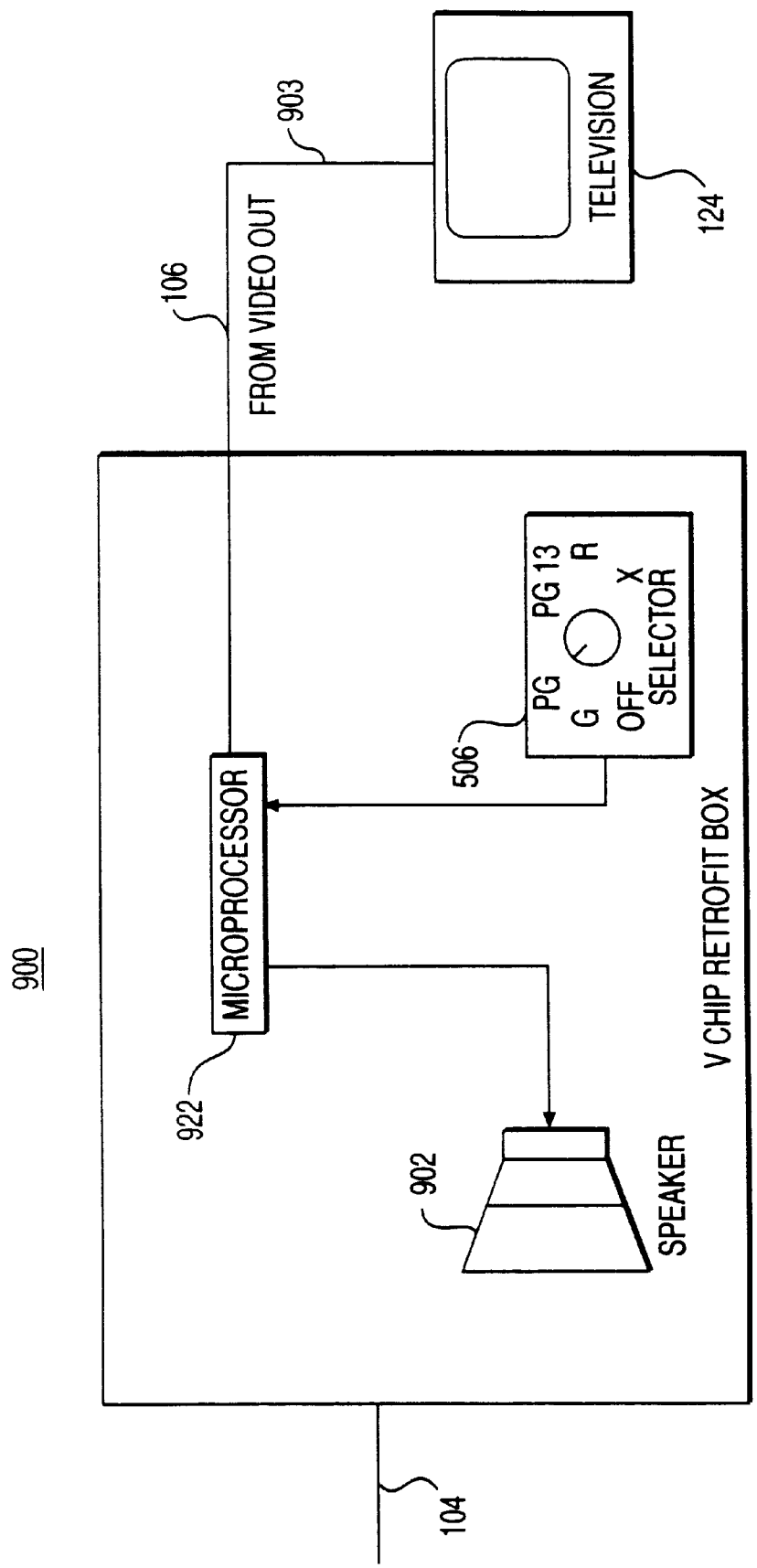
FIG. 9 is a block diagram of a broadcast signal receiver retrofit apparatus according to a fifth embodiment of the present invention.

FIG. 9 is a block diagram of a broadcast signal receiver retrofit apparatus according to a fifth embodiment of the present invention. The retrofit device 900 shown in FIG. 9 is a simple device designed to give an audible alert to a viewer when a program with an objectionable rating is present. This would be useful in a situation where a parent is present or nearby during television viewing by a child. Because of its simplicity and small number of components, the retrofit device 900 is very inexpensive to manufacture. Retrofit device 900 preferably includes a microprocessor 922, a rating selector 506, and a speaker 902. The retrofit device 900 can be battery operated and requires only one connection to television 124. Preferably, a user can disable the audio or visual warning.

Figure 10:
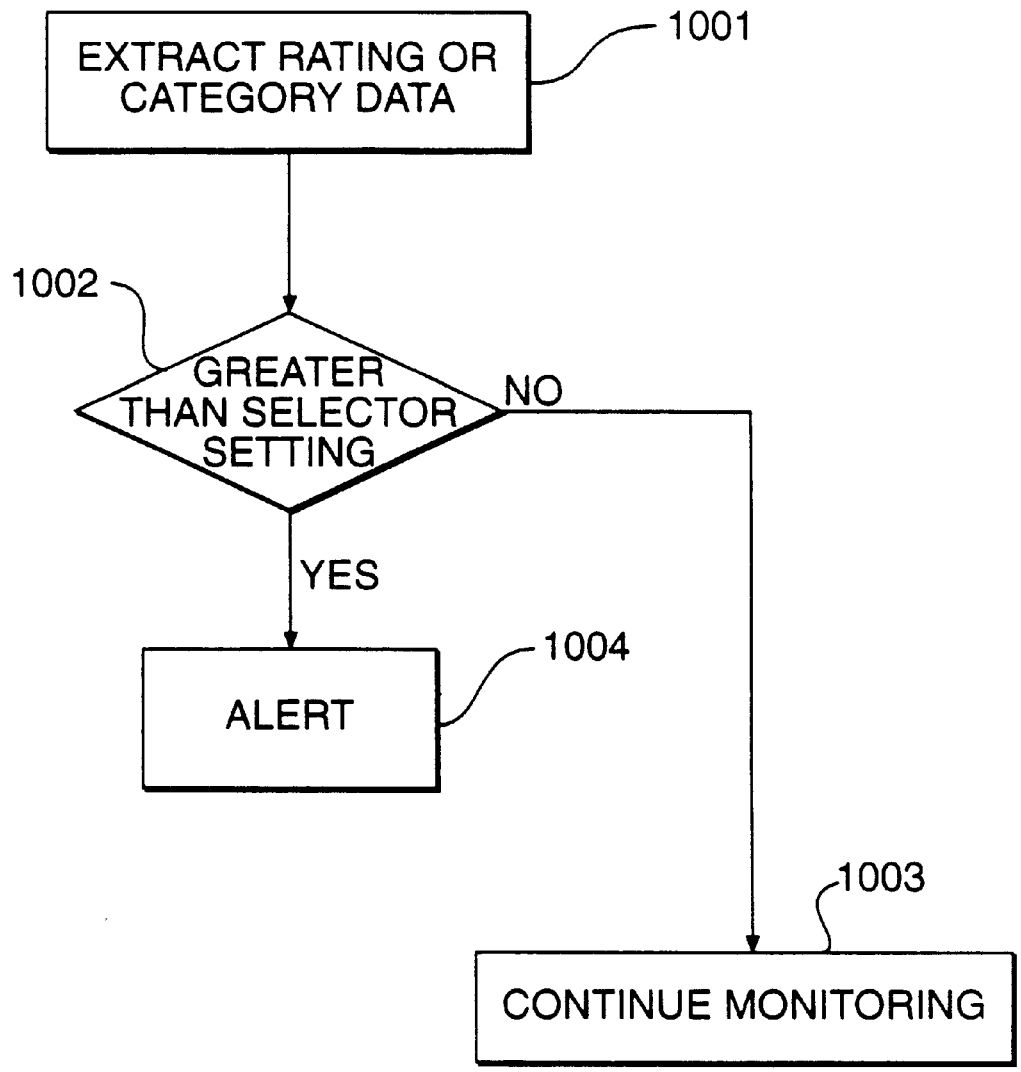
FIG. 10 is a flow diagram of the operation of the broadcast signal receiver retrofit apparatus shown in FIG. 9.

FIG. 10 is a flow diagram of the operation of the broadcast signal receiver retrofit apparatus 900 shown in FIG. 9. First, the microprocessor 922 extracts rating data from the video out signal 903 output from television 124 (step 1001), and compares that data with the setting on the rating selector 506 (step 1002). If the comparison indicates that a program is acceptable, the microprocessor 922 continues monitoring (step 1003). If the comparison indicates that a program is unacceptable, the microprocessor 922 signals the speaker 902 to give an audible alert, such as the sound of a smoke alarm or a synthesized voice, warning that an objectionable program is being broadcast (step 1004). A visual alert, such as a flashing light or even a simple display of the actual rating, could be substituted for, or added to, the audible alert.

Figure 11:
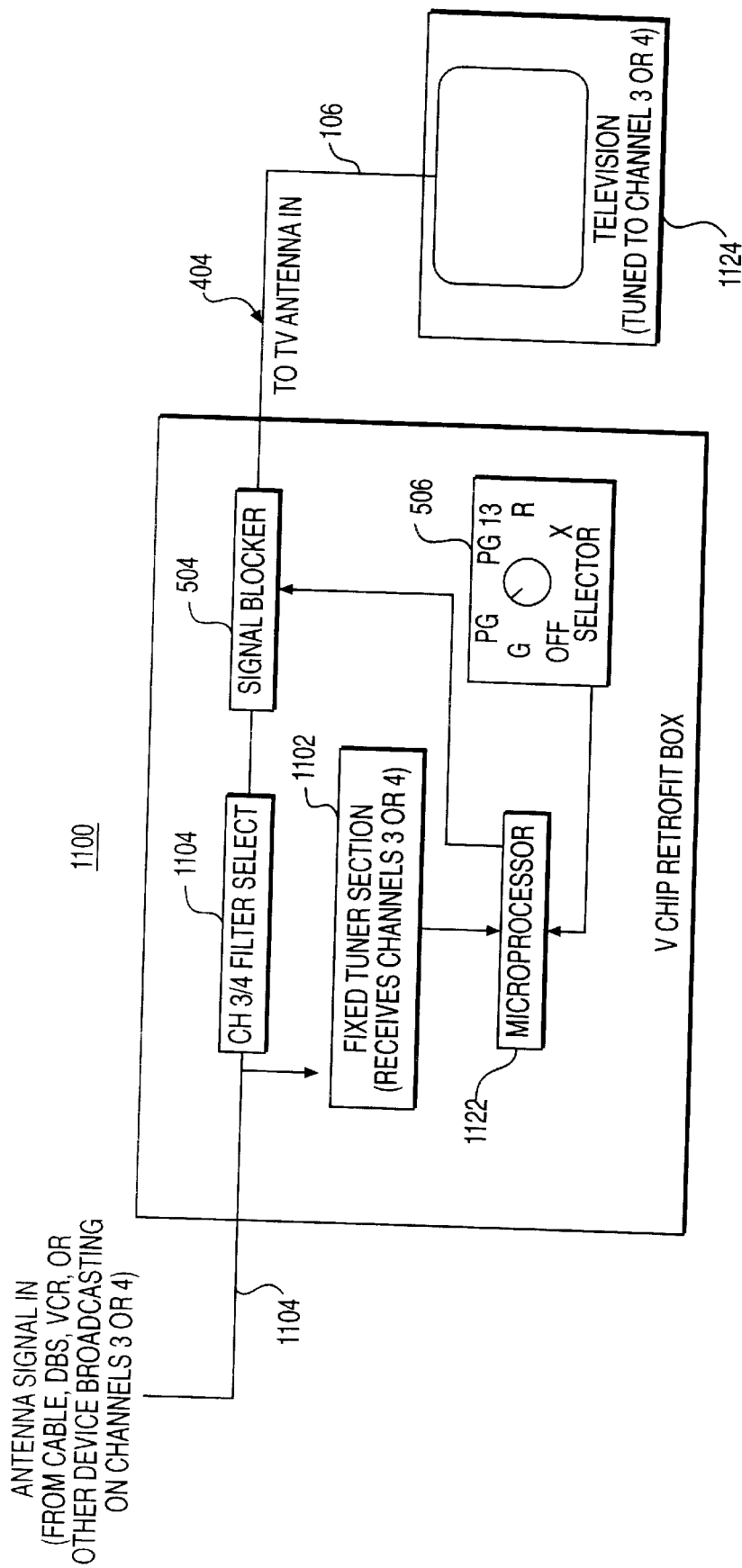
FIG. 11 is a block diagram of a broadcast signal receiver retrofit apparatus according to a sixth embodiment of the present invention.

FIG. 11 is a block diagram of a broadcast signal receiver retrofit apparatus according to a sixth embodiment of the present invention. The retrofit device 1100 shown in FIG. 11 works with any device that broadcasts signals on channel 3 or 4, for example, a cable box, a DBS receiver, or a VCR, and preferably includes a fixed tuner section 1102 that receives channel 3 or 4 over cable 1104. The input signal is also input to a channel 3/4 bandpass filter, which ensures that only signals on channels 3 and 4 are allowed to be processed by the retrofit device 1100.

The retrofit device 1100 preferably includes a microprocessor 1122, a signal blocker 504, and a rating selector 506. An unacceptable program is blocked by the signal blocker 504 and will not be output to the television 1124. As with the retrofit device 100 of FIG. 1, protective measures may be used to secure the system from tampering, for example, locking the connectors behind an access door, and running a connection check. Program selection is made from the cable box, DBS box, VCR, or other device broadcasting on channel 3 or 4.

Figure 12:
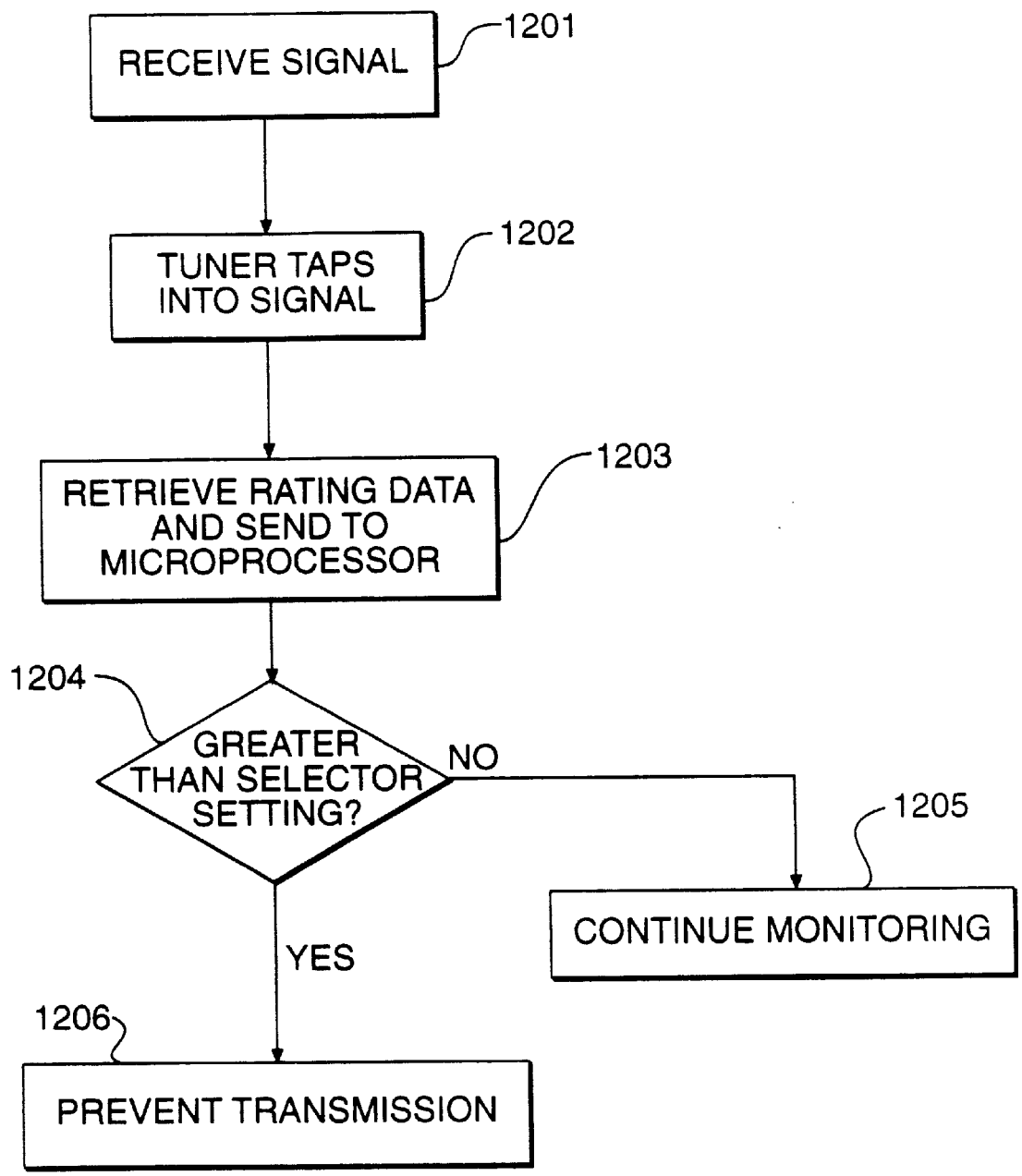
FIG. 12 is a flow diagram of the operation of the broadcast signal receiver retrofit apparatus shown in FIG. 11.

FIG. 12 is a flow diagram of the operation of the broadcast signal receiver retrofit apparatus shown in FIG. 11. The retrofit device 1100 receives a signal on channel 3 or 4 (step 1201). The fixed tuner section 1102 taps into this signal 404 (step 1202), which continues through the channel 3/4 bandpass filter 1104 and the signal blocker 504 to the antenna input of television 1124. The fixed tuner section 1102 retrieves any program rating data from the input signal and sends it to the microprocessor 1122 (step 1203). The microprocessor 1122 compares the rating data with the setting of the rating selector 506 (step 1204). If the comparison indicates that a program is acceptable, the microprocessor 1122 directs the signal blocker 504 to pass the signal 404 to the television 1124 (step 1205). If the comparison indicates that a program is not acceptable, the microprocessor 1122 activates the signal blocker 504 thereby preventing transmission of the signal 1104 to the television 1124 (step 1206).

Figure 13:
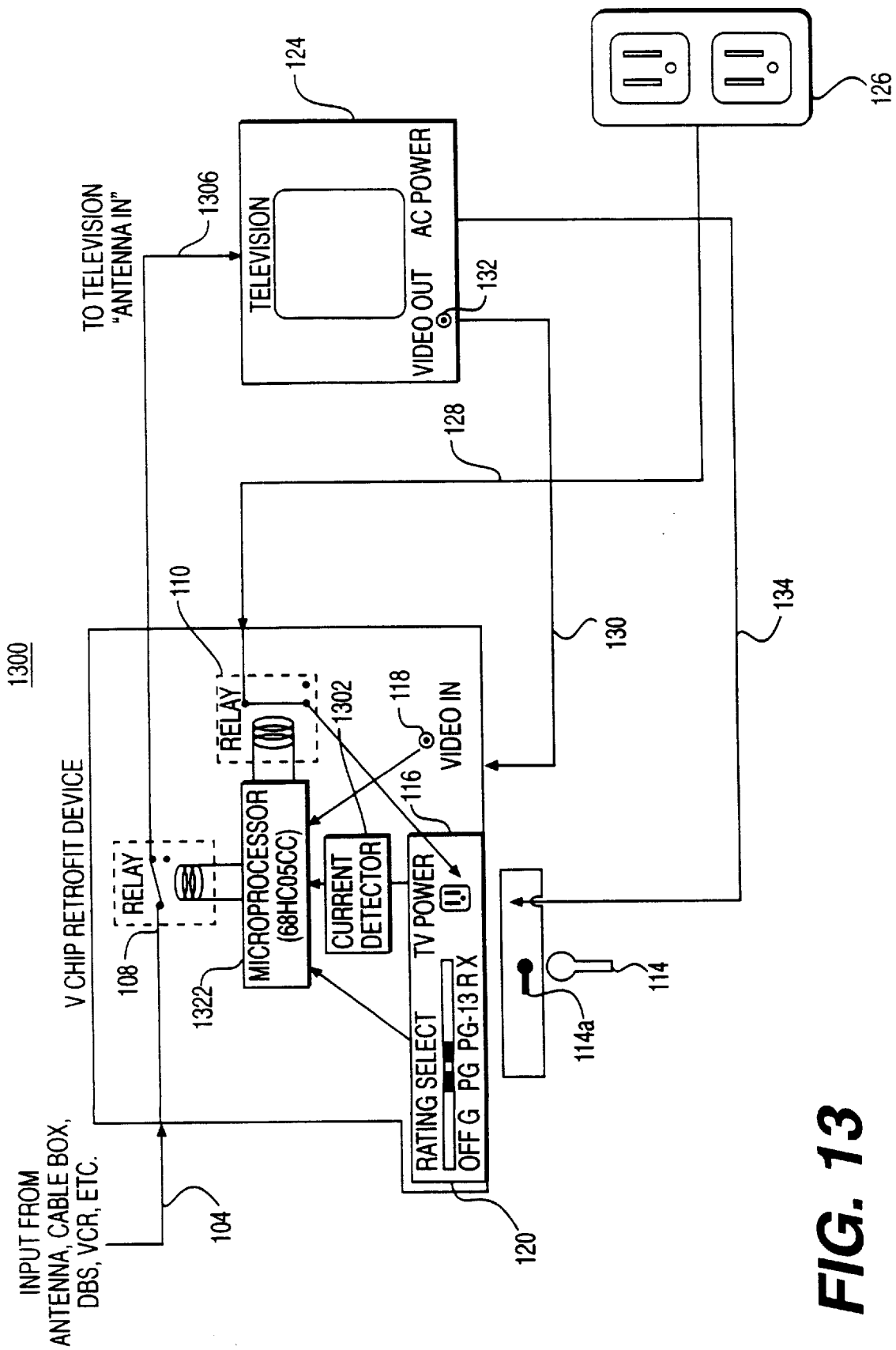
FIG. 13 is a block diagram of a broadcast signal receiver retrofit apparatus according to a seventh embodiment of the present invention.

FIG. 13 is a block diagram of a broadcast signal receiver retrofit apparatus according to a seventh embodiment of the present invention. The retrofit apparatus shown in FIG. 13 is similar to that shown in FIGS. 1 and 3, but uses alternate connection check circuitry. As shown in FIG. 13, an input signal over signal in cable 104 is passed through relay 108 in the retrofit device 1300 and output via antenna in cable 1306 to the television 124. The video out 132 from the television 124 is connected to video in 118 on the retrofit device 1300 via video cable 130, and the power cord 134 of television 124 the is plugged into the TV power receptacle 116 on the retrofit device 1300. The power feed cord 128 of the retrofit device 1300 is plugged into plug 126.

A simple current detector 1302, preferably comprising an operational amplifier and an inductor, allows the microprocessor 1322 to determine whether the television 124 is turned on.

When current detector 1302 determines that the television 124 is on, the microprocessor 1322 looks for a video signal, such as a sync pulse, and rating data at video in connection 118. If microprocessor 1322 detects a rating, it compares the rating to the rating set on the rating selector 120. If the comparison reveals an acceptable rating, the microprocessor 1322 continues to monitor.

If the rating is not acceptable, the microprocessor 1322 opens the relay 108, for a certain period of time, for example, approximately two seconds, and then closes relay 108 long enough to gather new rating data. Once closed, the microprocessor 1322 again looks for rating data and continues the cycle.

If, during a relay 108 open period, the microprocessor 1322 detects a video signal at video in connection 118, it assumes that someone has tried to bypass the retrofit device 1300 and directs the power relay 110 to open, preferably for a period of approximately 30 seconds. Afterwards, the power relay 110 closes and the cycle continues.

If the microprocessor 1322 detects that the television power is on from current detector 1302, the relay 108 is closed, but no video signal is detected at video in connection 118, then the power relay 110 is opened and power to the television 124 is cut off for approximately 30 seconds. Afterwards, the power relay 110 closes and the cycle continues.

By these mechanisms, retrofit device 1300 ensures that all connections are properly maintained. Additionally, the retrofit device 1300 cannot be fooled since the microprocessor 1322 is looking specifically for a video signal at the video in connection 118.

Figure 14:
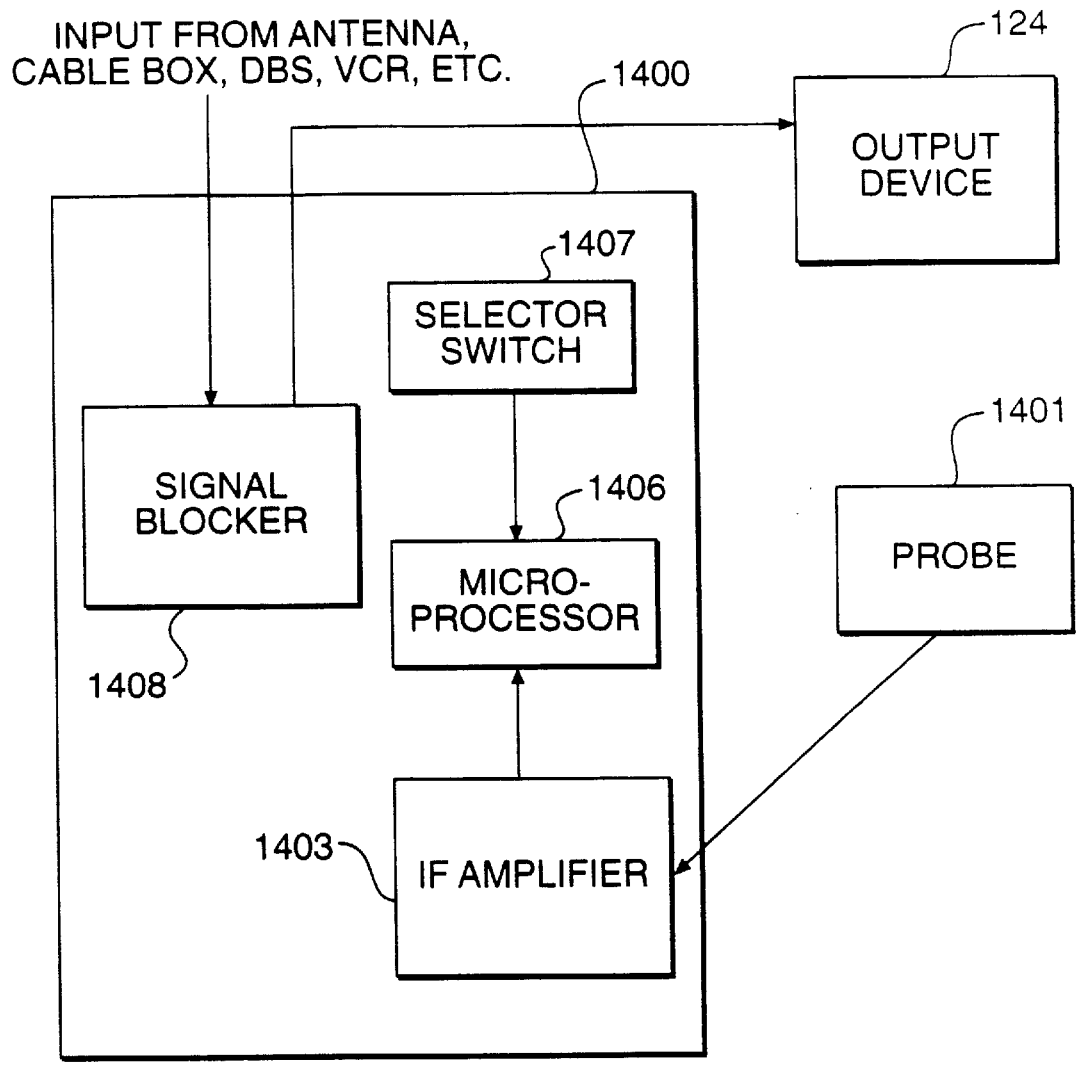
FIG. 14 is a block diagram of a broadcast signal receiver retrofit apparatus according to an eighth embodiment of the present invention.

In contrast with systems shown in FIGS. 1, 3, 9 and 13, a retrofit device in accordance with the present invention can be implemented without requiring a direct connection with a video out terminal of the output device. FIG. 14 shows an alternate configuration of a retrofit device that does not require such a connection.

FIG. 14 is a block diagram of a broadcast signal receiver retrofit apparatus according to an eighth embodiment of the present invention. As shown in FIG. 14, the retrofit device 1400 is connected to a probe 1401, such as an RF inductive element situated near output device 124 to detect the video signal within the output device 124, which is an IF signal. Probe 1401 is located to detect maximum signal from the output device 124. When, for example, the output device 124 is a television, the probe 1401 may be located under the television and may be approximately 0.3 inches in diameter and 0.3 inches thick. The dimensions of the probe 1401 can vary depending on the type, shape, and configuration of the output device 124.

The output of probe 1401 is input to an IF amplifier 1403 in retrofit housing 1402. Amplifier 1403 provides an impedance match to the probe 1401 and compensates for any insertion loss of the signal. The microprocessor 1406, which receives the output of the IF amplifier 1403, extracts any rating signals from the demodulated signal input from probe 1401.

As in the previously described embodiments, the microprocessor 1406 compares the demodulated rating signals with the user input preset level, input at selector switch 1407 and determines whether the programming should be blocked by signal blocker 1408. When activated, the signal blocker 1408 prevents the intelligible transmission of the input signal to the output device 124.

The embodiments shown in FIGS. 1, 3, 9 and 13 may be designed to utilize an RF inductive element instead of the direct connection with a video out terminal.

Figure 15:
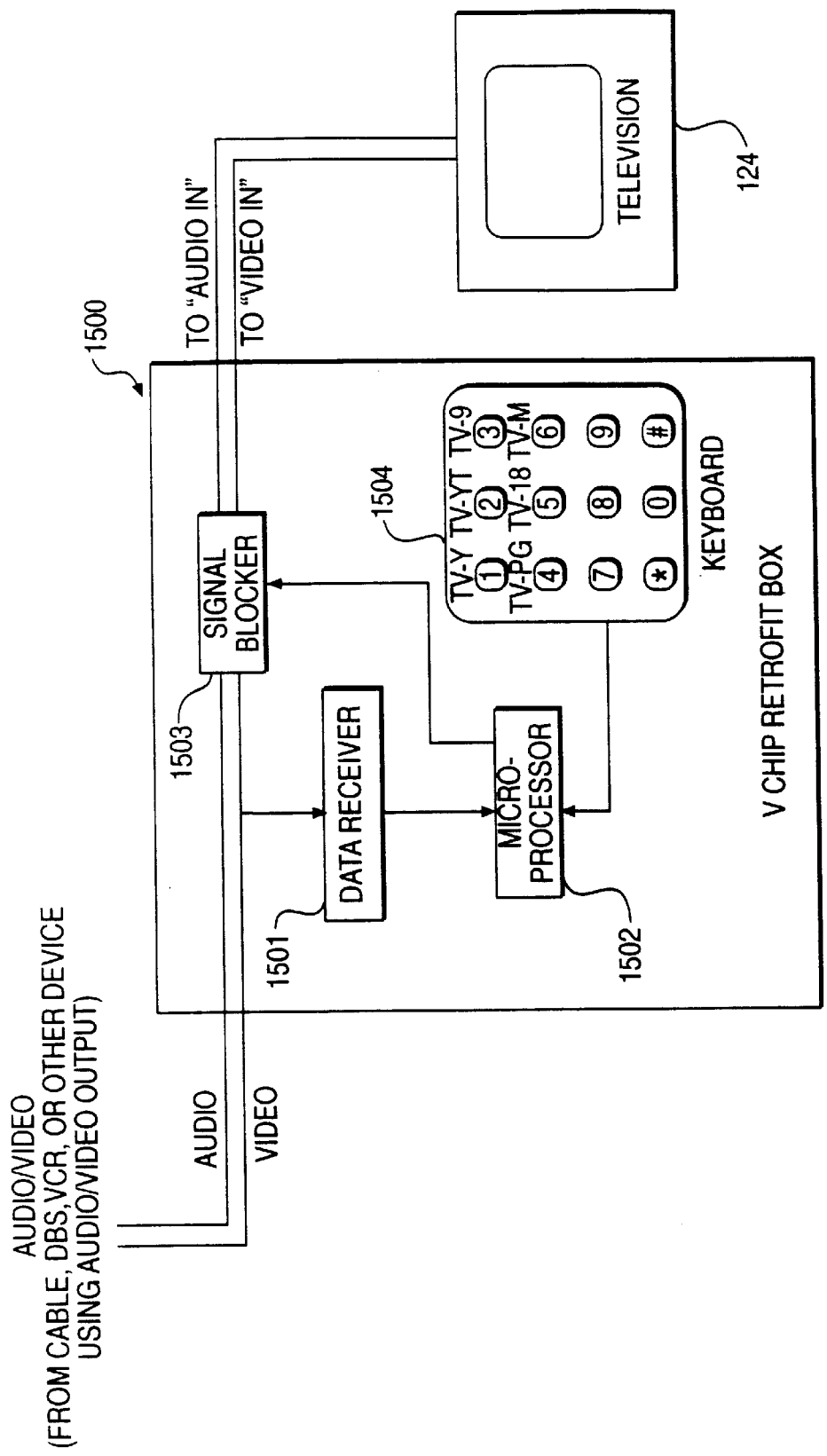
FIG. 15 is a block diagram of a broadcast signal receiver retrofit apparatus according to a ninth embodiment of the present invention.

FIG. 15 is a block diagram of a broadcast signal receiver retrofit apparatus according to a ninth embodiment of the present invention. In the embodiment shown in FIG. 15, the retrofit device 1500 receives demodulated audio and video signals from a device such as a VCR, a computer, or another external source of demodulated signals. The demodulated audio and video signals are input to a data receiver 1501. The data receiver 1501 extracts the rating data from the video signal and outputs that data to the microprocessor 1502. In an alternate configuration, the data receiver can be part of the microprocessor.

Also input to the microprocessor 1502 is the user selected rating input via keypad 1504. The keypad 1504 is similar to the selector switch 120, shown in FIG. 1, and allows the user to enter an appropriate rating. As shown in FIG. 15, the rating scheme can, alternatively to that shown in FIG. 1, be the television rating scheme TV-Y, TV-Y7, TV-G, TV-PG, TV-14, and TV-M. In addition to allowing the user to enter a rating selection, the keypad 1504 enables use of a personal identification number (PIN) to enable or disable the retrofit device 1500.

The rating select signal is input to the microprocessor 1502, and as described above, is compared to the rating signal extracted by the data receiver 1501. If the detected rating is greater than the set rating, the microprocessor 1502 directs the signal blocker 1503 to prevent the humanly perceivable output to the output device 124 of the input signal.

Figure 16:
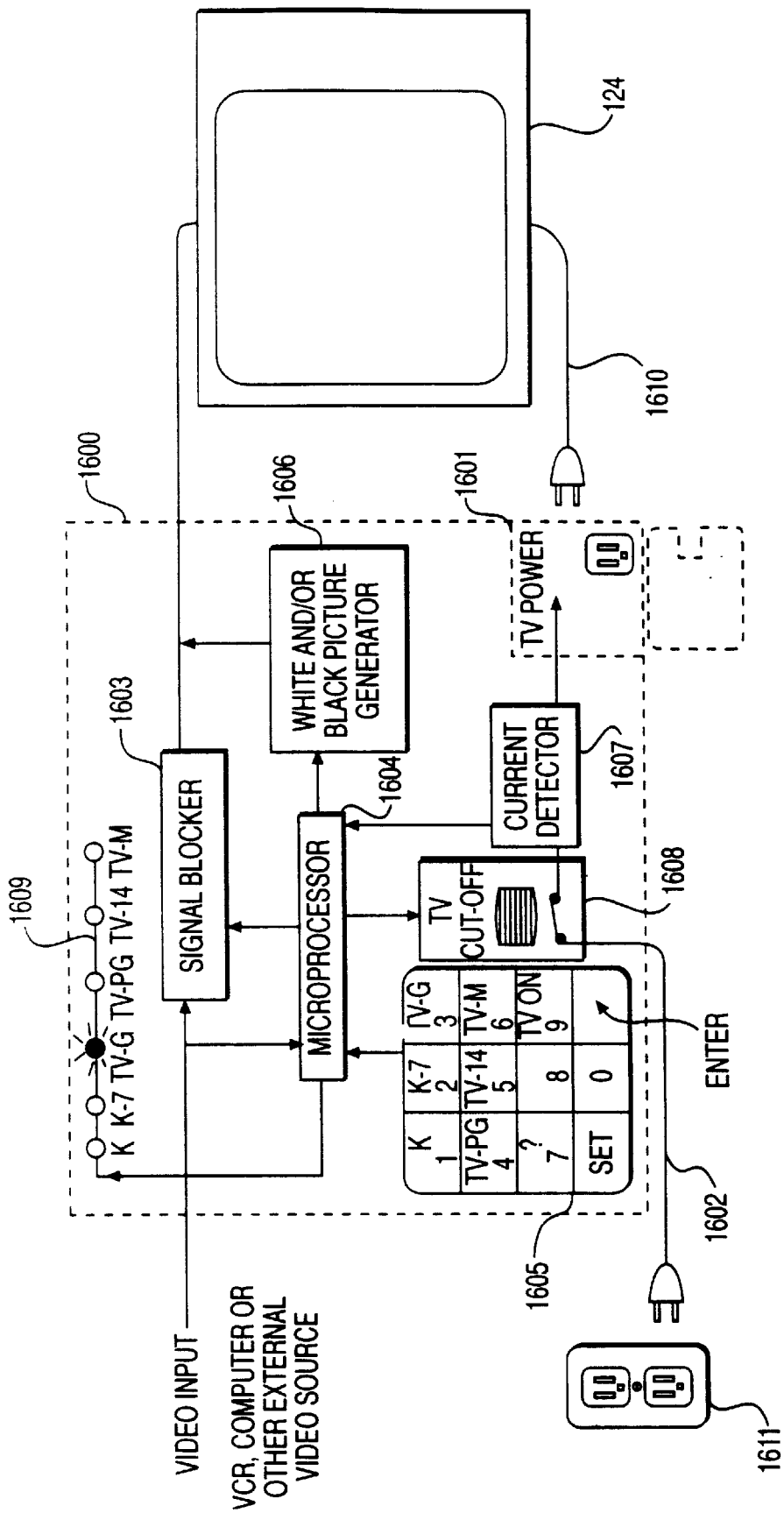
FIG. 16 is a block diagram of a broadcast signal receiver retrofit apparatus according to an tenth embodiment of the present invention.

FIG. 16 is a block diagram of a broadcast signal receiver retrofit apparatus according to a tenth embodiment of the present invention. The retrofit apparatus of FIG. 16 is similar to that shown in FIG. 15, but includes a security feature to allow detection of tampering with the retrofit device.

As shown in FIG. 16, the power cord 1610 of the output device 124 is plugged into power outlet 1601 of the retrofit device 1600. The power cord 1610 may be locked into the retrofit device 1600, in a similar manner as shown and described with respect to FIG. 1. Power cord 1602 of the retrofit device 1600 is plugged into outlet 1611.

Like the retrofit apparatus shown in FIG. 15, retrofit device 1600 receives an input demodulated video and audio signals, which are input to microprocessor 1604. The rating data is extracted by the microprocessor 1604. User selection is input at keypad 1605. The user input and the rating signal are compared by microprocessor 1604 and appropriate signals are output to the signal blocker 1603. As shown in FIG. 16, in addition to the keypad 1605, the retrofit device 1600 may include a series of LEDs 1609 that visually indicate the user input rating selection input at keypad 1605.

To determine whether the connections between the retrofit device 1600 and the output device 124 are properly maintained, the retrofit device 1600 also preferably includes a white and/or black picture generator 1606 that periodically generates, under the direction of the microprocessor 1604, a white and/or black picture signal that is output to the output device 124. The current detector 1607, which is connected to the power outlet 1601, detects any change in the current at the output device 124 caused by the white and/or black signal. If a change in current corresponding to the white and/or black signal is detected, then it is assumed that the connections between the output device 124 and the retrofit device 1600 have been properly made. If no change in current is detected, then it is assumed that the connections have not been properly made, and the microprocessor 1604 directs the cut-off relay 1608 to open, thereby cutting off the power supply to the output device 124.

A similar connection check can be used with a retrofit device employing the probe 1401 shown in FIG. 14. In such a configuration, an alternating series of black and white signals or special video test signals can be output to the output device 124, and the probe 1401 can be used to detect a change in voltage. If a corresponding change in voltage is detected, then it is assumed that the connections between the output device and the retrofit device have been properly made. The above described connection check can be used in other retrofit device configurations in which the retrofit device is not connected to the video out connection of the output device.

The embodiments shown and described above use a signal blocker to prevent the output device from receiving a humanly perceivable output if the rating information does not meet the preset level. For example, using a relay for the signal blocker, requires closing the relay for a short period of time to retrieve rating information from the input signal. In this case, video information is passed to the output device while the relay is closed.

It is possible, however, to prevent the transmission of video data to the output device and at the same time collect the rating information by using a high speed switch circuit as the signal blocking device. By using a high speed switch for signal blocking, only the active picture portion of the of the input signal is blocked, upon a determination that the rating level of the input signal is greater that the preset level. By blocking only the active picture portion of the input signal, data signals within the non-picture portion of the input signal can be continuously monitored. Any of the retrofit devices described above that utilize a signal blocker may use the high speed switch and associated circuitry as described in greater detail below.

Figure 17:
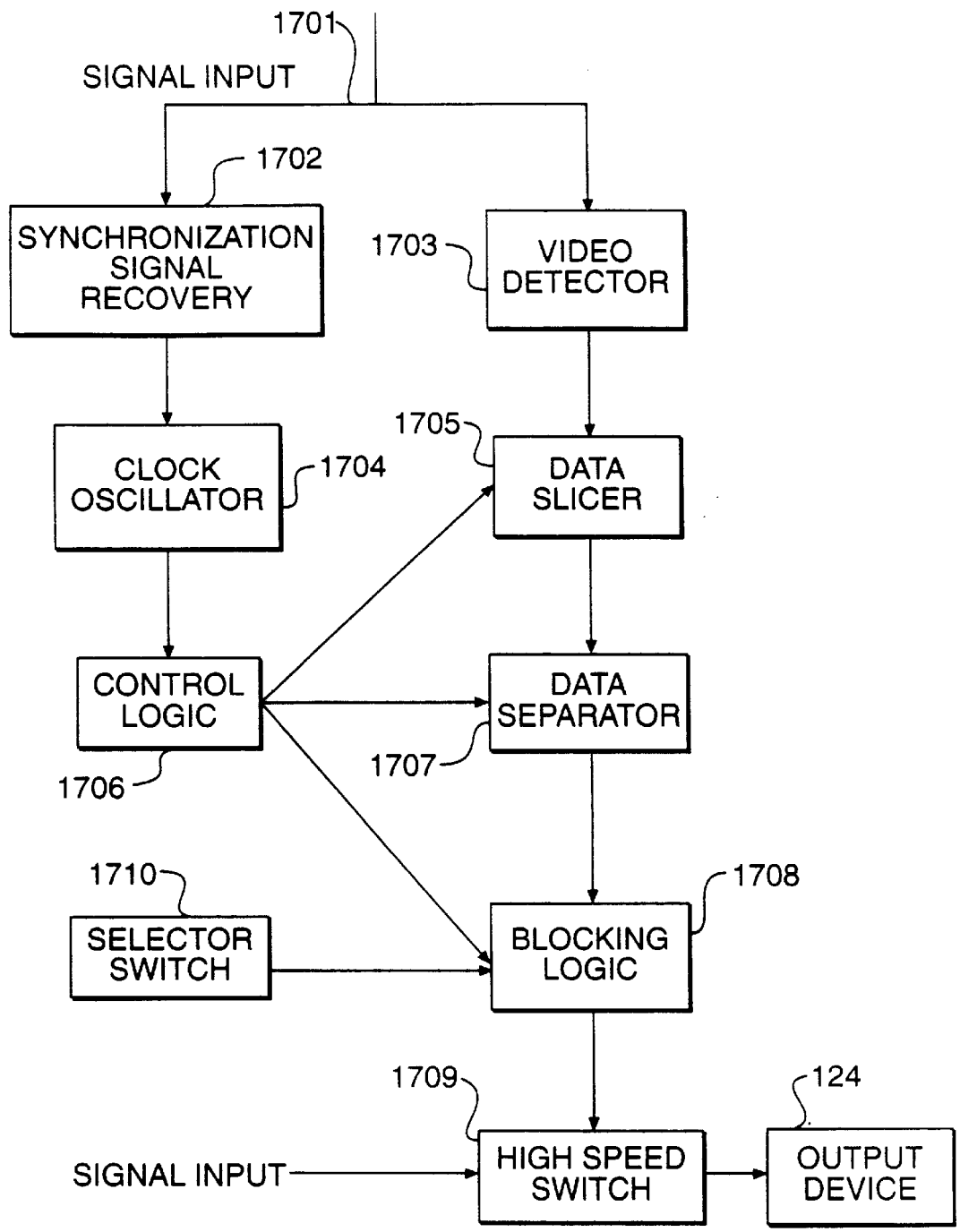
FIG. 17 is a block diagram of a portion of a retrofit apparatus employing a high speed switch as a signal blocker.

FIG. 17 is a block diagram of a portion of a retrofit apparatus employing a high-speed switch as a signal blocker. As shown in FIG. 17, the signal is input at signal input section 1701. The signal can be the output of a video out connection on an output device, such as video out 132 shown in FIG. 1, or the IF signal output from probe 1401, shown in FIG. 14. The data from signal input section 1701 is input to synchronization signal recovery unit 1702 where the synchronization signals from the input signal are obtained. The synchronization signals are output to the clock oscillator 1704, which locks the clock of the retrofit device to control the timing at which the signal output to the output device 124 will be blocked. The output of clock oscillator is input to control logic 1706. To use the high-speed switch 1709, the device must be properly clocked and controlled to block the active picture portion but to pass the data signals.

The input signal is also output to a video detector 1703, which detects the video data on the input signal. The video data is then passed to the data slicer 1705, which detects and extracts the data signals, such as the line 21 data, from the video data. The data signals are input to data separator 1707, which separates the rating data from the other data signals and outputs the rating data as data words to the blocking logic 1708. Based on the input data words, the selection entered at user selection 1710, and a control signal from control logic 1706, the blocking logic 1708 outputs a blocking signal if the data words indicate that the rating of the input programming is higher than the level set at selector switch 1710. The blocking signal is output to the high speed switch 1709, which will block only the active picture portion of the output signal and will not affect the data portion of the output signal. In that manner, continuous monitoring of the input signal can be effected. The synchronization signal recovery unit 1702, video detector 1703, clock oscillator 1704, data slicer 1705, control logic 1706, data separator 1707, and blocking logic 1708 may be contained within a microprocessor such as microprocessor 122, shown in FIG. 1.

With retrofit device using the high speed switch 1709 and associated circuitry, a connection check can be run by having the high speed switch 1709 selectively blank random horizontal synchronization pulses or line 21 data. The data separator 1707 preferably inspects the input signal for a corresponding signal anomaly. If the input signal has the corresponding anomaly, then the integrity of the system interconnection is presumed to be correct. If the signal anomaly is not detected, then the retrofit device can cut the power to the output device 124.

In the embodiments described above, video data, in the form of rating data is detected and compared with a user input. Therefore, it is necessary that at the time of detection the rating data not be corrupted. A noise filtering method could be employed in an output device in which various lines of the input signal are delayed and overlapped (averaged). If such a noise suppression method is performed by an output device such as a the television receiver, before the signal is input to the retrofit device, the video data, such as line 21 data would be corrupted before it was input to the retrofit device. To prevent this problem, the retrofit device can be equipped to cancel the signals on the lines surrounding the video data. For example, lines 20 and 22, surrounding line 21 could be zeroed or set to a constant value. The average of lines 20–22 would then be equal to the line 21 data or to the line 21 data plus a constant. In this manner, the video data, such as the line 21 data would not be corrupted and could be used for rating detection and subsequent blocking, as described above.

The figures and accompanying discussion, illustrate and describe presently preferred embodiments and methods of the present invention. Those skilled in the art will understand that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

What is claimed is:

1. A method of controlling whether a demodulated video signal containing rating information is sent to an output device, comprising the steps, executed by a blocking device, of:

receiving the demodulated video signal before the demodulated video signal reaches the output device;

extracting rating information from the demodulated video signal;

comparing the extracted rating information with a preset rating level;

outputting the demodulated video signal to the output device;

preventing the output device from producing a humanly perceivable output when the retrieved rating information does not meet the preset level;

performing a connection check to verify that the blocking device is properly connected to the output device; and disabling the output device if the connection check fails.

2. The method as recited in claim 1, wherein the performing step includes the substeps of:

inputting a first connection check signal to the output device from the blocking device; and detecting a change in a second connection check signal input to the blocking device based on the first connection check signal.

3. The method as recited in claim 2, wherein the step of inputting a first connection check signal includes the substep of receiving an output from one of a white and black picture generator.

4. The method as recited in claim 2, wherein the detecting step includes the substep of detecting a change in current in the second connection check signal.

5. The method as recited in claim 1, wherein the demodulated video signal includes an active picture portion and data signals, and wherein the preventing step includes the substeps of blocking the output device from receiving the active picture portion; and passing the data signals to the output device.

6. The method as recited in claim 5, wherein the extracting step includes the substep of separating the rating data from the data signals.

7. The method as recited in claim 6, further comprising the steps of:

performing a connection check to verify that the blocking device is properly connected to the output device; and disabling the output device if the connection check fails.

8. The method as recited in claim 7, wherein the performing step includes the substep of selectively blanking random horizontal synchronization pulses in the demodulated video signal.

9. The method according to claim 7, wherein the performing step includes the substep of selectively blanking line 21 data in the demodulated video signal.

10. The method as recited in claim 1, wherein the demodulated video signal includes video data and wherein the method further comprises the step of canceling signals on lines surrounding the video data before extracting the rating data.

11. A broadcast signal receiver retrofit apparatus for controlling whether a broadcast signal containing rating information is sent to an output device, the retrofit apparatus comprising:

a broadcast signal input device for receiving a demodulated video signal before the demodulated video signal reaches the output device;

a data receiver for extracting rating information from the demodulated video signal;

comparing circuitry for comparing the extracted rating information with a preset user level;

output circuitry for outputting the demodulated video signal to the output device;

blocking circuitry for preventing the output device from producing a humanly perceivable output when the extracted rating information does not meet the preset level; and connection check circuitry for determining whether the retrofit apparatus is properly connected to the output device.

12. The retrofit apparatus as recited in claim 11, wherein the connection check circuitry comprises:

a picture generator that supplies one of a white and a black picture signal to the output device; and a current detector that detects a change in current at the output device based on the picture signal supplied by the picture generator.

13. The retrofit apparatus as recited in claim 11, the retrofit apparatus further comprising:

a synchronization signal recovery unit, coupled to the broadcast signal input device, for extracting synchronization signals from the demodulated video signal;

a clock oscillator, coupled to the synchronization signal recovery unit, for locking a clock of the retrofit apparatus based on the extracted synchronization signals;

a video detector, coupled to the broadcast signal input device, for extracting video data from the demodulated video signal;

a data separator, coupled to the data receiver, for outputting the rating information as data words to the comparing circuitry; and a high-speed switch, coupled to the blocking circuitry, for preventing the output of the video data to the output device.

14. The retrofit apparatus as recited in claim 13, further comprising connection check circuitry for determining whether the retrofit apparatus is properly connected to the output device.

15. The retrofit apparatus as recited in claim 14, wherein the connection check circuitry comprises:

the high-speed switch for selectively blanking random horizontal synchronization pulses; and the data separator for checking an input signal for a change corresponding to the blanked random horizontal synchronization pulses.

16. The retrofit apparatus as recited in claim 11, wherein the demodulated video signal includes video data, and wherein the retrofit apparatus further comprises canceling circuitry for canceling signals on lines surrounding the video data before extracting the rating data.

17. The retrofit apparatus as recited in claim 11, further comprising a user input selection device for input of the preset user level.

18. The retrofit apparatus as recited in claim 17, further comprising a visual display device for visually displaying the preset user level.

19. The retrofit apparatus as recited in claim 18, wherein the visual display device comprises a plurality of LEDs.

20. A method of controlling whether a broadcast signal containing rating information is sent to an output device, comprising the steps, executed by a blocking device, of:

receiving the broadcast signal before the broadcast video signal reaches the output device;

passing the broadcast signal to the output device;

monitoring an auxiliary signal from the output device, the auxiliary signal being input to the blocking device by an RF inductive element situated near the output device;

extracting rating information using the auxiliary signal;

comparing the extracted rating information with a preset rating level;

preventing the output device from producing a humanly perceivable output when the retrieved rating information does not meet the preset level performing a connection check to verify that the blocking device is properly connected to the output device; and disabling the output device if the connection check step fails.

21. The method as recited in claim 20, wherein the step of performing a connection check includes the substeps of:

inputting a connection check signal to the output device;

detecting a change in the auxiliary signal input to the blocking device based on the connection check signal; and performing the disabling step based on the results of the detecting step.

22. The method as recited in claim 21, wherein the detecting step comprises the substep of detecting a change in voltage of the auxiliary signal.

23. A broadcast signal receiver retrofit apparatus for controlling whether a broadcast signal containing rating information is sent to an output device, the retrofit apparatus comprising:

a broadcast signal input device for receiving a broadcast signal before it reaches the output device;

a broadcast signal output device for outputting the broadcast signal to the output device;

an auxiliary broadcast signal input device for receiving an auxiliary signal from the output device, the auxiliary signal being input to the retrofit apparatus by an RF inductive element situated near the output device;

a retrieving device for retrieving the rating information using the auxiliary signal;

comparing circuitry for comparing the extracted rating data with a preset rating level;

blocking circuitry for preventing the output device from producing a humanly perceivable output when the retrieved rating information does not meet the preset level; and connection check circuitry for determining whether the retrofit apparatus is properly connected to the output device.

24. The retrofit apparatus as recited in claim 23, wherein the connection check circuitry comprises:

a signal generator that supplies connection check signal to the output device;

a voltage detector that detects a change in voltage at the output device based on the connection check signal supplied by the signal generator.

* * * * *